United States Patent [19]

Uhrhan et al.

[11] 4,088,629

[45] May 9, 1978

[54] STABILIZATION OF SYNTHETIC POLYMERS

[75] Inventors: Paul Uhrhan; Reinhard Lantzsch, both of Cologne; Harald Oertel; Ernst Roos, both of Odenthal; Dieter Arlt, Cologne, all of Germany

[73] Assignee: Bayer Aktiengesellschaft, Leverkusen-Bayerwerk, Germany

[21] Appl. No.: 730,201

[22] Filed: Oct. 6, 1976

[30] Foreign Application Priority Data

Oct. 11, 1975  Germany ............................ 2545647

[51] Int. Cl.$^2$ ................................................ C08K 5/34
[52] U.S. Cl. .......................... 260/45.8 N; 260/2.5 BB; 260/293.63; 260/293.64; 260/293.75; 260/293.76; 260/293.87

[58] Field of Search ...................... 260/45.8 N, 293.63, 260/293.64, 293.87, 293.75, 293.76, 2.5 BB

[56] References Cited

U.S. PATENT DOCUMENTS

| | | | |
|---|---|---|---|
| 3,072,663 | 1/1963 | Meltzer et al. .................. | 260/293.87 |
| 3,274,230 | 9/1966 | Braun .............................. | 260/293.63 |
| 3,864,765 | 8/1972 | Matsui et al. ................... | 260/45.8 N |
| 3,937,711 | 2/1976 | Cook ............................... | 260/45.8 N |

Primary Examiner—V. P. Hoke
Attorney, Agent, or Firm—Connolly and Hutz

[57] ABSTRACT

Stabilizers according to the invention are used for stabilizing synthetic polymers against discoloration and degradation under the effect of visible and/or UV light, heat and/or atmospheric influences.

8 Claims, No Drawings

STABILIZATION OF SYNTHETIC POLYMERS

This invention relates to the stabilisation of synthetic polymers against degradation by the addition, in a quantity sufficient to prevent degradation, of at least one compound corresponding to the general formula (I)

(I)

In this general formula I, X represents the radical

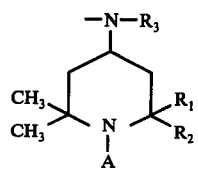

in which

A represents hydrogen, a straight-chain or branched chain alkyl radical with 1 to 20 carbon atoms, an alkenyl or alkinyl radical with 3 to 12 carbon atoms, an aralkyl radical with 7 to 12 carbon atoms or the group —CH$_2$—CHR$_4$—OH where R$_4$ represents H, methyl or phenyl; R$_1$ and R$_2$ may be the same or different and each represent a straight-chain or branched chain alkyl radical with 1 to 12 carbon atoms, or R$_1$ and R$_2$ together with the ring carbon atom to which they are attached form a cycloalkyl ring containing from 5 to 12 ring carbon atoms;

R$_3$ represents hydrogen, a straight-chain or branched chain alkyl radical with 1 to 20 carbon atoms, a cycloalkyl radical with 5 to 12 carbon atoms, an aralkyl radical with 7 to 12 carbon atoms, a β-cyanoethyl radical, a β-alkoxy carbonyl ethyl radical with 1 to 3 carbon atoms in the alkoxy moiety, an aryl radical with 6 to 14 carbon atoms, the group —CH$_2$—CHR$_4$OH, where R$_4$ represents H, methyl or phenyl, or the group

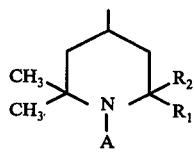

in which A, R$_1$ and R$_2$ are as defined above. Z can have the same meaning as X or may represent a group —NUV where U and V may be the same or different and each represents:

H, a straight-chain or branched chain alkyl radical with 1 to 20 carbon atoms, a cycloalkyl radical with 5 to 12 carbon atoms, an aralkyl radical with 7 to 12 carbon atoms or an aryl radical with 6 to 14 carbon atoms which may in turn be substituted by one or more alkyl radicals with 1 to 8 carbon atoms and by C$_1$-C$_4$ alkoxy, hydroxy or nitro groups or by chlorine or bromine atoms. In addition the radical U may represent a group R$_5$—W where R$_5$ represents an aryl radical with 6 or 10 ring carbon atoms optionally substituted by one or more chlorine, bromine, methyl or methoxy groups or a straight-chain or branched chain alkyl radical with 1 to 8 carbon atoms or an aralkyl radical with 7 to 12 carbon atoms. W represents a CO— or SO$_2$—group. The radical Y represents a group of the general formula =N—R$_6$ where R$_6$ may have the following meaning: H, a straight-chain or branched chain alkyl radical with 1 to 20 carbon atoms, a cycloalkyl radical with 5 to 7 carbon atoms, an aralkyl radical with 7 to 12 carbon atoms or an aryl radical with 6 to 14 carbon atoms which may in turn be substituted by alkyl radicals containing 1 to 8 carbon atoms and by C$_1$-C$_4$ alkoxy, hydroxy or nitro groups or by chlorine or bromine atoms.

Compounds of general formula I with the meaning defined above, in which 1, 2 or 3 radicals represented by the group R$_3$, U and V are hydrogen, may also be represented by the tautomeric formulae II and III:

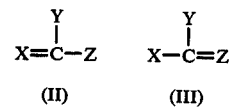

In this case, Y represents a group NHR$_6$ where R$_6$ is as defined above.

The following are examples of the radicals R$_1$ and R$_2$: methyl, ethyl, propyl, isopropyl, n-butyl, sec-butyl, n-hexyl, n-octyl, and n-dodecyl radicals, but preferably alkyl radicals with 1 to 4 carbon atoms and, with particular preference, methyl radicals.

The following are examples of groups in which R$_1$ and R$_2$ form a cycloalkyl ring with the ring carbon atom to which they are attached: spirocyclopentyl, spirocyclohexyl, spiromethylcyclohexyl, spirocycloheptyl and spirocyclododecyl rings. R$_1$ and R$_2$ preferably form a spirocyclohexyl ring.

Examples of A include hydrogen, the methyl, ethyl, n-propyl, isopropyl, n-butyl, sec-butyl, n-hexyl, n-octyl, n-dodecyl, allyl, α-methallyl, prop-2-inyl, benzyl, α-methylbenzyl, p-methyl benzyl, α-naphthyl methyl, β-hydroxy ethyl, β-hydroxy propyl or β-hydroxy-β-phenyl ethyl group. A preferably represents hydrogen or a straight-chain or branched chain alkyl radical with 1 to 4 carbon atoms; hydrogen and the methyl group being particularly preferred.

The following are examples of R$_3$: H, straight-chain or branched chain alkyl groups such as methyl, ethyl, isopropyl, n-butyl, sec-butyl, octyl or stearyl, hydroxyalkyl groups such as β-hydroxy ethyl, β-hydroxy-β-methyl ethyl, β-hydroxy-β-phenyl ethyl: cycloalkyl groups such as cyclopentyl, cyclohexyl, methylcyclohexyl, cyclododecyl; aralkyl groups such as benzyl, phenyl ethyl; also the β-cyanoethyl group and alkoxy carbonyl ethyl radicals such as 2-methoxy carbonyl ethyl, 2-isopropoxy carbonyl ethyl and aryl radicals such as phenyl, naphthyl, also alkyl-, alkoxy-, halogen- (Cl, Br, I) or hydroxy-substituted alkyl groups, such as tolyl, tert-butyl phenyl, octylphenyl, methoxyphenyl, butoxyphenyl, chlorophenyl and hydroxyphenyl.

R$_3$ preferably represents hydrogen, straight-chain or branched chain alkyl radicals with 1 to 8 carbon atoms, such as methyl, ethyl, n-propyl, isopropyl, n-butyl, octyl; also cyclohexyl, methyl cyclohexyl, benzyl, β-cyanoethyl, 2-methoxy carbonyl ethyl and β-hydroxy ethyl. Hydrogen, methyl, cyclohexyl, benzyl, β-cyanoethyl and β-hydroxy ethyl are particularly preferred.

The following are examples of the radicals U and V: H, alkyl radicals such as methyl, ethyl, n-propyl, isopropyl, n-butyl, isobutyl, tert-butyl, n-hexyl, n-octyl, dodecyl, stearyl, cycloalkyl radicals such as cyclopentyl, cyclohexyl, methyl cyclohexyl, cyclododecyl; aralkyl groups such as benzyl, phenyl ethyl, and aryl radicals such as phenyl, naphthyl, also alkyl-, alkoxy-, bromine-, chlorine-, hydroxy- or nitro-substituted aryl groups such as tolyl, tert-butylphenyl, octylphenyl, methoxyphenyl, chlorophenyl and hydroxyphenyl.

U and V preferably represent hydrogen, straight-chain or branched chain alkyl radicals with 3 to 8 carbon atoms, such as n-propyl, isopropyl, n-butyl, isobutyl, tert-butyl, n-hexyl, n-octyl; also the cyclohexyl radical, the benzyl radical and aryl radicals, such as phenyl, tolyl, tert-butyl phenyl, chlorophenyl and naphthyl. n-Propyl, isopropyl, n-butyl, isobutyl, tert-butyl, n-hexyl, cyclohexyl, phenyl, tolyl, tert-butyl phenyl, chlorophenyl and naphthyl are particularly preferred.

The following are mentioned as examples of the radical $R_5$: phenyl, chlorophenyl, bromophenyl, tolyl, methoxy phenyl, naphthyl, methyl, ethyl, propyl, isopropyl, benzyl; preferably aromatic radicals, of which phenyl, chlorophenyl, tolyl and methoxyphenyl are particularly preferred. The radical W preferably represents a carbonyl group.

Examples of the radical $R_6$ include H, methyl, ethyl, isopropyl, sec-butyl, tert-butyl, n-dodecyl, tetradecyl, octadecyl, cyclohexyl, benzyl, phenyl ethyl, phenyl, naphthyl, chlorophenyl, bromophenyl, dichlorophenyl, nitrophenyl, tolyl, dimethyl phenyl, methoxy phenyl. Hydrogen, alkyl radicals with 3 to 12 carbon atoms, such as n-propyl, sec-butyl, tert-butyl, n-dodecyl are preferred, as are cyclohexyl, phenyl, naphthyl, tolyl, chlorophenyl and nitrophenyl radicals. H, phenyl, chlorophenyl, nitrophenyl and naphthyl radicals are particularly preferred.

The following are mentioned as specific examples of compounds corresponding to the general formula I above:

N,N'-dimethyl-N"-[2,2,6,6-tetramethyl-piperidinyl]-guanidine
N,N'-dimethyl-N"-[1,2,2,6,6-pentamethyl-piperidinyl]-guanidine
N,N'-diethyl-N"'-[1-benzyl-2,2,6,6-tetramethyl-piperidinyl]-guanidine
N,N'-diisopropyl-N"-[2,2,6,6-tetramethyl-piperidinyl]-guanidine
N-isopropyl-N'-tert.-butyl-N"-[2,2,6,6-tetramethyl-piperidinyl]-guanidine
N,N'-di-n-butyl-N"-[2,2,6,6-tetramethyl-piperidinyl]-guanidine
N,N'-dioctyl-N"-[2,2,6,6-tetramethyl-piperidinyl]-guanidine
N,N'-dioctyl-N"-[1,-β-hydroxyethyl-2,2,6,6-tetramethyl-piperidinyl]guanidine
N,N'-didodecyl-N"-[2,2,6,6-tetramethyl-piperidinyl]-guanidine
N,N'-distearyl,-N"-[2,2,6,6-tetramethyl-piperidinyl]-guanidine
N,N'-diphenyl-N"-[2,2,6,6-tetramethyl-piperidinyl]-guanidine
N,N'-diphenyl-N"-[1,2,2,6,6-pentamethyl-piperidinyl]-guanidine
N,N'-bis-[p-chlorophenyl]-N"-[2,2,6,6-tetramethyl-piperidinyl]-guanidine   N,N'-bis-[p-chlorophenyl]-N"-[1-allyl-2,2,6,6-tetramethyl-piperidinyl]-guanidine
N,N'-bis-[p-chlorophenyl]-N"-methyl-N"-[2,2,6,6-tetramethyl-piperidinyl]-guanidine
N,N'-di-o-tolyl-N"-[2,2,6,6-tetramethyl-piperidinyl]-guanidine
N,N'-di-o-tolyl-N"-benzyl-N"-[2,2,6,6-tetramethyl-piperidinyl]-guanidine
N,N'-di-m-tolyl-N"-[2,2,6,6-tetramethyl-piperidinyl]-guanidine
N,N'-di-p-tolyl-N"-β-hydroxyethyl-N"-[2,2,6,6-tetramethyl-piperidinyl]-guanidine
N,N'-bis-[o,o'-diisopropylphenyl]-N"-[2,2,6,6-tetramethyl-piperidinyl]-guanidine
N,N'-bis-[p-nitrophenyl]-N"-[2,2,6,6-tetramethyl-piperidinyl]-guanidine
N,N'-bis-[p-methoxyphenyl]-N"-[2,2,6,6-tetramethyl-piperidinyl]-guanidine
N,N'-bis-[p-methoxyphenyl]-N"-β-cyanoethyl-N"-[2,2,6,6-tetramethyl-piperindinyl]-guanidine
N,N'-dinaphthyl-N"-[2,2,6,6-tetramethyl-piperidinyl]-guanidine
N,N'-dicyclohexyl-N"-[2,2,6,6-tetramethyl-piperidinyl]-guanidine
N,N'-dicyclohexyl-N"-[1,2,2,6,6-pentamethyl-piperidinyl]-guanidine
N,N'-dicyclohexyl-N"-cyclohexyl-N"-[2,2,6,6-tetramethyl-piperidinyl]-guanidine
N-acetyl-N'-[2,2,6,6-tetramethyl-piperidinyl]-guanidine
N-butyryl-N'-[2,2,6,6-tetramethyl-piperidinyl]-guanidine
N-phenyl acetyl-N'-[2,2,6,6-tetramethyl-piperidinyl]-guanidine
N-benzoyl-N'-[2,2,6,6-tetramethyl-piperidinyl]-guanidine
N-benzoyl-N'-[1,2,2,6,6-pentamethyl-piperidinyl]-guanidine
N-benzoyl-N'-methyl-N'-[2,2,6,6-tetramethyl piperidinyl]-guanidine   N-p-chlorobenzoyl-N'-[2,2,6,6-tetramethyl-piperidinyl]-guanidine
N-p-chlorobenzoyl-N'-cyclohexyl-N'-[2,2,6,6-tetramethyl-piperidinyl]-guanidine
N-p-chlorobenzoyl-N'-[1-β-hydroxyethyl-2,2,6,6-tetramethyl-piperidinyl]-guanidine
N-m-bromobenzoyl-N'-[2,2,6,6-tetramethyl-piperidinyl]-guanidine
N-o-methyl-benzoyl-N'-[2,2,6,6-tetramethyl-piperidinyl]-guanidine
N-α-naphthoyl-N'-[2,2,6,6-tetramethyl-piperidinyl]-guanidine   N-methylsulphonyl-N'-[2,2,6,6-tetramethyl-piperidinyl]-guanidine
N-p-methylbenzene sulphonyl-N'-[2,2,6,6-tetramethyl-piperidinyl]-guanidine
N-phenyl-N',N"-bis-[2,2,6,6-tetramethyl-piperidinyl]-guanidine   N-phenyl-N',N"-dimethyl-N',N"-bis-[2,2,6,6-tetramethyl-piperidinyl]-guanidine
N-phenyl-N',N"-bis-[1,2,2,6,6-tetramethyl-piperidinyl]-guanidine
N-2,5-dichlorophenyl-N',N"-bis-[2,2,6,6-tetramethyl-piperidinyl]-guanidine
N-3-nitrophenyl-N',N"-bis-[2,2,6,6-tetramethyl-piperidinyl]-guanidine
N-tolyl-N',N"-bis-[2,2,6,6-tetramethyl-piperidinyl]-guanidine
N-naphthyl-N',N"-bis-[2,2,6,6-tetramethyl-piperidinyl]-guanidine
N-methyl-N',N"-bis-[2,2,6,6-tetramethyl-piperidinyl]-guanidine
N-cyclohexyl-N'N"-bis-[2,2,6,6-tetramethyl-piperidinyl]-guanidine
N-phenylethyl-N',N"-bis-[2,2,6,6-tetramethyl-piperidinyl]-guanidine
4-guanidino-2,2,6,6-tetramethyl-piperidine
4-guanidino-1,2,2,6,6-pentamethyl-piperidine 4-guanidino-1-benzyl-2,2,6,6-tetramethyl-piperidine N-isopropyl-N'-[2,2,6,6-tetramethyl-piperidinyl]-guanidine N-cyclohexyl-N'-[2,2,6,6-tetramethyl-piperidinyl]-guanidine N-phenyl-N'-[2,2,6,6-tetramethyl-piperidinyl]-guanidine N-phenyl-N'-[1,2,2,6,6-pentamethyl-piperidinyl]-guanidine N-p-chlorophenyl-N'-[2,2,6,6-tetramethyl-piperidinyl]-guanidine N-p-tert.-butyl-phenyl-N'-[2,2,6,6-tetramethyl-piperidinyl]-guanidine N-o-methoxymethyl-phenyl-N'-[2,2,6,6-tetramethyl-piperidinyl]-guanidine N,N'-dibutyl-N'-[2,2,6,6-tetramethyl-piperidinyl]-guanidine The compounds of general formula I used in accordance with the invention as stabilisers for synthetic polymers may be produced by various methods: Method (1) 4-aminopiperidines corresponding to general formula IV are reacted with isocyanide dichlorides corresponding to general formula V. The reaction may be illustrated by reaction equation 1:

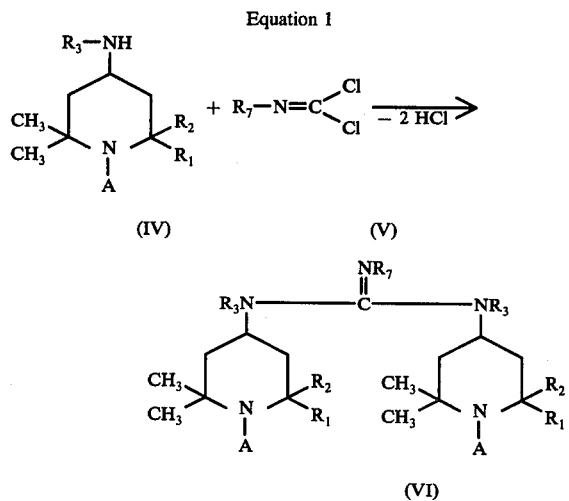

The radicals A, $R_1$, $R_2$ and $R_3$ are as previously defined and the radical $R_7$ has the same meaning as the already defined radical $R_6$ except $R_7$ may not be hydrogen.

The isocyanide dichlorides of general formula V required as starting materials are known compounds (cf. Angew. Chem. 79. 663 to 680 (1967).

Reaction with the known 4-aminopiperidines corresponding to general formula IV is carried out by initially introducing the 4-aminopiperidine in a solvent and adding the isocyanide dichloride dropwise thereto.

Suitable solvents are, for example, water; alcohols such as methanol, ethanol, isopropanol; ethers such as diisopropyl ether, dioxane, tetrahydrofuran; hydrocarbons such as petrol, benzene, toluene or xylene; halogenated hydrocarbons such as methylene chloride, chloroform, carbon tetrachloride, chlorobenzene, and other solvents such as acetone, acetonitrile, ethyl acetate, glycol monomethyl ether, etc.

A basic compound in a quantity equivalent to the quantity of hydrogen chloride liberated during the reaction is best added to the reaction mixture. Preferred bases are hydroxides, carbonates and oxides of the alkali metals and alkaline earth metals, sodium, potassium and calcium hydroxide being particularly preferred.

In one particularly preferred variant of the production of the compounds of general formula VI used in accordance with the invention as stabilisers for organic polymers, the reaction is carried out in a biphasic system consisting of an aqueous phase and an organic phase. The solvents used for the organic phase are water-immiscible organic solvents, for example, petrol, benzene, toluene, xylene, methylene chloride, chloroform, carbon tetrachloride, diisopropyl ether etc.

The reaction is carried out at temperatures in the range from $-10°$ C to $+100°$ C, preferably at temperatures in the range from $0°$ C to $80°$ C and, with particular preference, at temperatures in the range from $0°$ C to $50°$ C.

From 2 to 4 moles, preferably 2 to 3 moles and, with particular preference, 2 moles of 4-aminopiperidine may be used per mole of isocyanide dichloride.

Substantially insoluble reaction products are separated off by filtration. Following removal of the solvent by evaporation, reaction products remaining dissolved in the organic phase are optionally purified by recrystallisation or distillation.

The process may of course also be carried out continuously for example in a tubular reactor, in a cascade of reaction vessels or in any other apparatus of the type commonly used for continuous processes. Method (2) 4-Aminopiperidines corresponding to general formula VII are added with carbodiimides corresponding to general formula VIII. The reaction may be illustrated by equation 2 below:

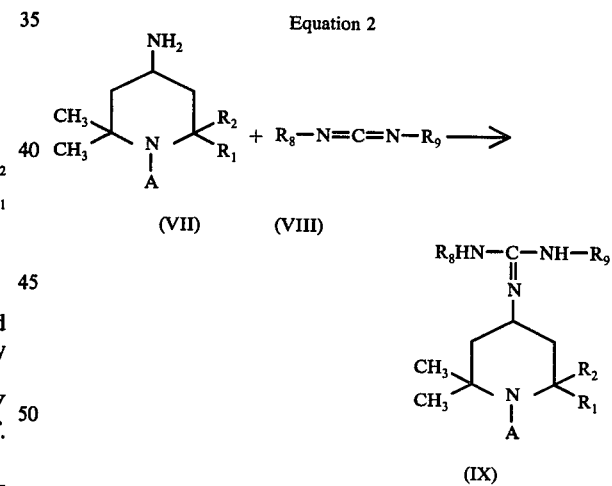

Compounds corresponding to general formula IX may also be represented by the tautomeric formulae IXa and IXb.

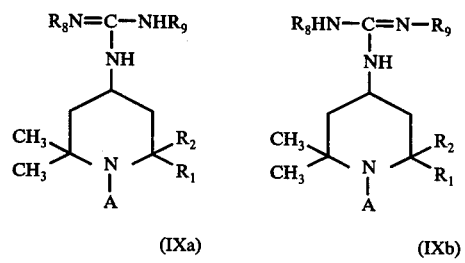

The radicals A, R₁ and R₂ are as previously defined. R₈ and R₉ may be the same or different and have the same meaning as the already defined radical R₆ except for hydrogen.

The carbodiimides required as starting materials are known compounds. They can be produced particularly easily from isocyanates inter alia (Cf. J. Amer. Chem. Soc., 84, 3673 (1962).

They are preferably reacted with the known 4-amino piperidines by combining the reactants and leaving them to react with one another for a while at elevated temperature. The reaction temperature is in the range from 20° C to 200° C., preferably in the range from 50° C to 160° C and, with particular preference, in the range from 80° C to 140° C. The reaction time is in the range from 1 hour to 24 hours, preferably in the range from 1 hour to 16 hours, a reaction time in the range from 2 to 10 hours being particularly preferred.

The reactants may be reacted with one another in any quantitative ratios. It is preferred to use from 1 to 1.5 moles of the 4-aminopiperidine and particularly preferred to use from 1 to 1.1 mole of the 4-aminopiperidine per mole of carbodiimide.

The reaction may be carried out in a solvent which is inert under the reaction conditions. Solvents such as these are, for example, hydrocarbons such as cleaning spirit, toluene, xylene; also chlorobenzene, o-dichlorobenzene, glycol monomethyl ether acetate and dioxane, etc. However, the reaction is preferably carried out in the absence of a solvent.

In general, the reaction is carried out under normal pressure, although it may also be carried out under reduced or elevated pressure. It may be of particular advantage to carry out the reaction under an elevated pressure of up to about 10 bars, more especially up to about 5 bars, in order to obtain a higher reaction velocity and a shorter reaction time.

In addition to the monomeric carbodiimides corresponding to general formula VIII, polymeric carbodiimides of the type which may readily be obtained from polyfunctional isocyanates in accordance with the method described in J. Amer. Chem. Soc. 84, 3673 (1962), may also be used for the reaction, in which case the reaction may be carried out in the same way as described above. The polymeric guanidines obtained in this way may also be used in accordance with the invention as stabilisers for synthetic polymers.

If necessary, solid reaction product may be purified by recrystallisation, whilst liquid products are optionally purified by distillation in vacuo.

The process may of course also be carried out continuously in an apparatus of the type commonly used for continuous processes. Method (3) 4-Aminopiperidines corresponding to general formula XI are reacted with cyanamides corresponding to general formula XII. The reaction may be illustrated by equation 3:

Equation 3

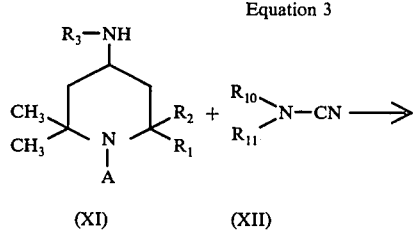

(XI)    (XII)

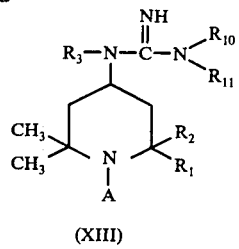

(XIII)

The radicals A, R₁, R₂ and R₃ are as defined above, the radicals R₁₀ and R₁₁ which may be the same or different represent hydrogen, a straight-chain or branched chain alkyl radical with 1 to 20 carbon atoms, a cycloalkyl radical with 5 to 12 carbon atoms, an aralkyl radical with 7 to 12 carbon atoms or an aryl radical with 6 to 14 carbon atoms which may in turn be substituted by alkyl radicals with 1 to 8 carbon atoms, also by methoxy or nitro groups and, in addition, by chlorine or bromine atoms. In addition, the radical R₁₀ may represent the group R₅—W which has been previously defined.

Cyanamides of general formula XIII are either known compounds or may readily be obtained by methods known from the literature (cf. S. Petersen in Houben-Weyl-Muller, Methoden der Org. Chemie, 4th Edition, Vol. VIII, page 173).

Their reaction with the known 4-aminopiperidines corresponding to general formula XI is generally carried out in an inert organic solvent at temperatures in the range from −10° C to +100° C and preferably at temperatures in the range from 0° to 80° C, temperatures in the range from 0° to 50° C being particularly preferred. Suitable organic solvents are, for example, hydrocarbons such as petroleum ether, pentane, cyclohexane, benzene, toluene and xylene, etc., also chlorinated compounds such as methylene chloride chloroform, carbon tetrachloride and chlorobenzene; it is also possible to use ethers, for example, diisopropyl ether, dioxane, tetrahydrofuran and dimethoxy ethane. Tetrahydrofurance, dioxane and toluene are particularly preferred.

The reaction components may be added in any order. From 0.5 to 8 moles, preferably from 0.9 to 1.5 moles and, with particular preference, from 1 to 1.2 moles of the 4-amino piperidine are used per mole of cyanamide. The reaction time is in the range from 10 minutes to 20 hours and preferably in the range from 30 minutes to 10 hours.

In general, it is not necessary to start with the pure cyanamides. It is advantageous to start with the amines on which the cyanamides are based, to react them with cyanogen chloride or cyanogen bromide, as known from the literature, and then to react the cyanamide obtained in this way, without further purification or intermediate isolation, with the 4-aminopiperidines corresponding to general formula XI.

In general, the reaction is carried out under normal pressure, although it may also be carried out under reduced or elevated pressure. It can be of advantage to carry out the reaction under an elevated pressure of up to about 10 bars, more especially up to about 5 bars, in order to obtain a higher reaction velocity and a shorter reaction time.

The process may of course also be carried out continuously in an apparatus of the type commonly used for continuous processes. Method (4) Another variant of the production of compounds corresponding to general formula XIII comprises reacting cyanamides of general formula XIV with amines corresponding to general formula XV. This reaction is illustrated by reaction equation 4:

Equation 4

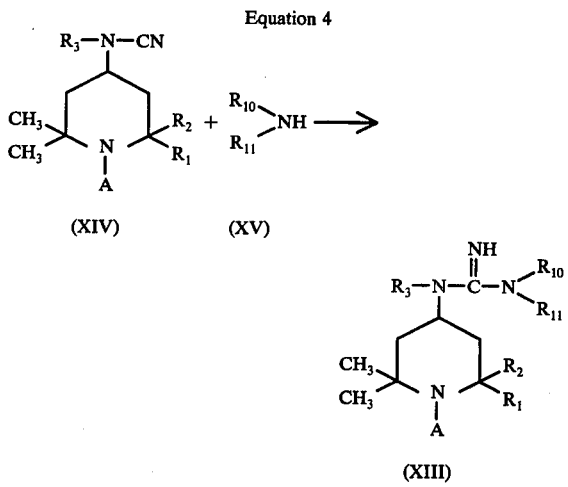

(XIII)

The radicals A, $R_1$, $R_2$ and $R_3$ are as previously defined. The radicals $R_{10}$ and $R_{11}$ have the same meaning as in equation 3, except that in equation 4 $R_{10}$ does not represent the group $R_5$—W.

Cyanamides corresponding to formula XIV are produced by reacting cyanogen chloride with aminopiperidines in accordance with equation 5

Equation 5

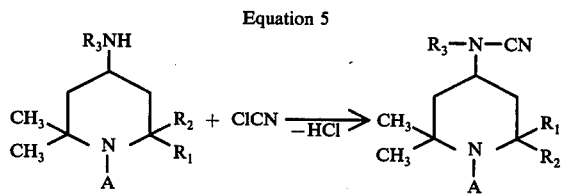

The radicals $R_1$, $R_2$, $R_3$ and A are as previously defined. The cyanogen chloride is reacted with the known piperidine derivatives by initially introducing the piperidine derivative in an inert organic solvent, adding one equivalent of a base for binding the hydrogen chloride formed during the reaction and then adding the cyanogen chloride dropwise at temperatures in the range from $-20°$ C to $+20°$ C and, with particular preference, at temperatures in the range from $-5°$ C to $+5°$ C. From 0.5 to 2.0 moles, preferably from 0.9 to 1.2 moles, and, with particular preference, 1 mole of the piperidine derivative is used per mole of cyanogen chloride.

Examples of suitable bases are tertiary amines, for example, trimethyl amine, triethyl amine or N,N-dimethyl benzyl amine, also carbonates, oxides and hydroxides of the alkali metals and alkaline earth metals.

It is preferred to use hydroxides of the alkali metals and alkaline earth metals, sodium and potassium hydroxide being particularly preferred.

Suitable inert organic solvents, in which the reaction according to the invention may be carried out, are for example petroleum ether, pentane, hexane, cyclohexane, benzene, toluene, xylene, chlorobenzene, o-dichlorobenzene, methylene chloride, diethyl ether, diisopropyl ether, dioxane, tetrahydrofuran and dimethoxy ethane.

In one preferred variant, the reaction is carried out in a biphasic system consisting of an aqueous phase and an organic phase. The organic phase consists of the piperidine derivative used as starting material and optionally an inert water-immiscible organic solvent of example, petroleum ether pentane, hexane, cyclohexane, benzene, toluene, xylene, chlorobenzene, o-dichlorobenzene, methylene chloride, chloroform, carbon tetrachloride, diisopropyl ether, 1,2-dichloroethane, 1,2-dichloropropane and trichloroethylene, etc.

Substantially insoluble reaction products are separated off by filtration. Following removal of the solvent by evaporation, reaction products which have remained dissolved in the organic phase are purified either by distillation or by recrystallisation.

In general, the reaction is carried out under normal pressure. However, it may also be carried out under reduced pressure or under an elevated pressure of up to about 10 bars, preferably up to about 2 bars.

The process may of course also be carried out continuously for example in a tubular reactor, in a cascade of reaction vessels or in any other apparatus of the type commonly used for carrying out continuous processes.

In general, the cyanamides are reacted with the amines in an inert organic solvent at temperatures in the range from $-10°$ C to $+100°$ C and preferably at temperatures in the range from $0°$ C to $80°$ C, temperatures in the range from $0°$ C to $50°$ C being particularly preferred. Examples of suitable organic solvents are hydrocarbons such as petroleum ether, pentane, cyclohexane, benzene, toluene and xylene, etc; also chlorinated compounds such as methylene chloride, chloroform, carbon tetrachloride and chlorobenzene in addition, it is possible to use ethers for example, diisopropyl ether, dioxane, tetrahydrofuran and dimethoxy ethane. Tetrahydrofuran, dioxane and toluene are particularly preferred.

The reaction components may be added in any order. From 0.5 to 8 moles, preferably from 0.9 to 1.5 moles and, with particular preference, from 1 to 1.2 moles of the amine may be used per mole of cyanamide. The reaction time is in the range from 10 minutes to 20 hours and preferably in the range from 30 minutes to 10 hours.

In general, the reaction is carried out under normal pressure, although it may also be carried out under reduced or elevated pressure. It may be of particular advantage to carry out the reaction under elevated pressures of up to about 10 bars, more especially up to about 5 bars, in order to obtain a higher reaction velocity and shorter reaction times.

The process may of course also be carried out continuously in an apparatus of the type commonly used for carrying out continuous processes.

The expression "synthetic polymers" covers the following products: polyurethanes, polyethylene oxide polymers, polypropylene oxide polymers, polyepoxide polymers, polyamides for example nylon 4, nylon 6, nylon 11, nylon 12, nylon 6,6, nylon 6,10 or copolyamides of the above components; aromatic polyamides of, for example, isophthalic acid and terephthalic acid, m-phenylene diamine and/or p-phenylene diamine; polyesters such as polyethylene terephthalate, polybutylene terephthalate or segmented copolyether esters of dihydroxy polytetramethylene oxide, terephthalic acid-/isophthalic acid ethylene glycol/1,4-butane diol or 1,4-cyclohexane diol; polycarbonates; polyimides, plastics based on cellulose such as, for example cellulose acetate, cellulose butyrate, polyacetals such as polyoxymethylene; polyolefins such as polyethylene of low and high density, polypropylene, polystyrene, polybutadiene, polyisoprene, polypentenamers, polyacrylonitrile, also homopolymers of other olefins and copolymers, such as ethylene/propylene copolymers, ethylene/propylene diene copolymers, ethylene/butylene copolymers, ethylene/vinyl acetate copolymers, styrene/butadiene copolymers, styrene/acrylontrile copolymers acrylonitrile/butadiene/styrene copolymers; polyvinyl chloride and polyvinylidene chloride; copolymers of vinyl chloride with vinylidene chloride and copolymers of vinyl chloride and vinylidene chloride with vinyl acetate and other olefins for example, acrylonitrile; unsaturated polyester resins.

One particularly important group of polymers to be stabilised are the elastic polyurethanes which may optionally be present in foamed form and which may be produced by methods known per se from the known starting materials. The polyurethanes are generally obtained by reacting relatively high molecular weight polyhydroxyl compounds (for example polyesters or polyethers with a molecular weight of about 500 to 5000, melting points preferably below 60° C) and aliphatic, araliphatic or aromatic polyisocyanates (preferably aromatic diisocyanates, such as tolylene diisocyanate or diphenyl methane-4,4'-diisocyanate), also so-called chain extending agents, i.e. low molecular weight compounds (molecular weight for example 18 to 400) containing 2 or more isocyanatereactive groups (for example water, low molecular weight diols, diamines, dihydrazides or similar compounds, for example aminoalcohols, aminohydrazides, hydroxy hydrazides, aminosemicarbazides, semicarbazide hydrazides, semicarbazide carbazinic esters or corresponding mixtures or these chain extending agents produced in one or several stages either in the melt or in solvents by a number of known and modifiable processes.

The following are mentioned as examples of starting materials: polyesters of adipic acid and dialcohols with 2 to about 10 carbon atoms, preferably those with more than 5 carbon atoms, the dialcohols also being usable for lowering the melting points of the polyesters in the mixture; polyesters of caprolactone and dialcohols, also polyalkylene ether diols, especially polytetramethylene ether diols, polytrimethylene ether diols, polypropylene glycol or corresponding copolyethers. Preferred diisocyanates are aromatic diisocyanates such as diphenyl methane-4,4'-diisocyanate, tolylene diisocyanate, araliphatic diisocyanates such as m-xylylene diisocyanate or even aliphatic diisocyanates, such as hexamethylene diisocyanate and dicyclohexyl methane-4,4'-diisocyanate. These starting materials are reacted, optionally with additional dialcohols, to form NCO-preadducts which preferably have the structures indicated in Belgian Patent Specification No. 734,194. Suitable chain extending agents, which may optionally be used in admixture or in a multistage reaction, are water and/or dialcohols or trialcohols, such as butane diol and p-xylylene glycols, trimethylol propane, aminoalcohols such as ethanolamine, diamines such as diphenyl methane-4,4'-diamine, 3,3'-dichlorodiphenyl methane-4,4'-diamine, but preferably aliphatic diamines such as ethylene diamine, 1,2-propylene diamine, isophorone diamine, metaxylylene diamine and hydrazone or dihydrazides, such as carbodihydrozide, oxalic acid dihydrazide, glutaric acid dihydrazide, pimelic acid dihydrazide, terphthalic acid dihydrazide, β-alanyl hydrazide or semicarbazide hydrazides, such as β-semicarbazide alanyl hydrazide.

It is preferred to stabilise polyurethanes which, in addition to urethane groups, also contain -NH-CO-NH- groups formed by the reaction of isocyanate groups with water and/or compounds containing terminal $NH_2$-groups (for example diamines, dihydrazides, carbodihydrazide, semicarbazide hydrazides or hydrazine) and which have a substantially linear, segmented molecular structure, are soluble in highly polar solvents, such as dimethyl formamide or dimethyl acetamide, before they are formed or shaped and of which the characteristic segments may be characterised by the following formula moiety:

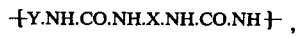

This segment may be formed from the reaction of an NCO-preadduct OCN.Y.NCO with a chain extending agent $H_2N.X.NH_2$.

The radical —Y— of the NCO-preadduct may be built up for example as follows:

or may have any other normal composition (cf. Belgian Patent Specification No. 734,194).

In the above formula, R represents a difunctional aliphatic, araliphatic or aromatic radical (of a diisocyanate), D represents the radical of a relatively high molecular weight polyhydroxyl compound with a molecular weight in the range from 500 to 5000 and with melting points below 60° C without its terminal hydroxyl groups (for example the radical of a polyalkylene ether, polyester, polyacetal, poly-N-alkyl urethane). X is the radical of a difunctional chain extender containing terminal $NH_2$-groups without the terminal $NH_2$-groups, for example an aliphatic, araliphatic, aromatic or heterocyclic radical, an —HN—CO—alkylene—CO—NH—radical, an —NH—CO—NH—$(CH_2)_2$—CO—NH—radical or a bond between two N-atoms. The synthesis of polyurethane (ureas) of this type is described in detail, for example in German Auslegeschrift No. 1,270,276, and in Belgian Patent Specification No. 734,194. Polyurethane foams can be produced, for example with the stabilisers added to the starting components (for example polyethers), by known methods and according to known compositions (cf. for example Kunststoff-Handbuch, Vol VII, Polyurethane, Carl Hanser Verlag Munich, 1966, pages 440 to 457, 504 to 531).

By virtue of their outstanding properties, the synthetic polymers are widely used, for example in the form of filaments, fibres, films, lacquers or sheeting. Unfortunately, one disdadvantage of these synthetic polymers is their poor stability to light and heat. Polyolefin, polyamide and polyurethane elastomers, for example, undergo considerable degradation under the effect of light and heat, as reflected in the loss of their favourable mechanical properties and also in occasionally very considerable discoloration.

Accordingly, a number of different stabilisers, such as for example phenol derivatives, benzophenone compounds or derivatives of benztriazole, have been proposed for stabilising these synthetic polymers. Unfortunately, these products are not entirely satisfactory.

It has now been found that compounds corresponding to general formula (I) provide synthetic polymers with an excellent degree of protection against degradation.

The stabilisers are used in particular for stabilising synthetic polymers against discoloration and degradation under the effect of visible and/or UV-light, heat and/or atmospheric influences such as oxygen, oxides of nitrogen, chlorine and exhaust combustion gases.

The compounds of general formula (I) used as stabilisers in accordance with the invention may readily be incorporated into the synthetic polymer by any of the standard processes for compounding additives in a polymer. For example, the liquid, molten or solid powder-form stabiliser may be mixed with the synthetic polymer or may be mixed in the form of a solution, suspension or emulsion with a melt, solution, suspension or emulsion of the synthetic polymer. Mixing may optionally be carried out during the actual preparation of the polymer. In the case of filaments, the stabiliser may even be applied to the surface in the form of a melt of the preparation or may be incorporated during wet spinning from the coagulation bath with the filaments in gel form.

The quantity in which the stabiliser is used in accordance with the invention is governed by the type and special application of the polymer and may be left to the discretion of the skilled man. In general, the stabiliser is used in a quantity of from 0.01 to 5% by weight, preferably in a quantity of from 0.05 tp 3.5% by weight and, with particular preference, in a quantity of from 0.05 to 2.5% by weight, based on the quantity of the polymer.

In addition to the stabilisers according to the invention, other known additives may be incorporated in the polymer. Additives such as these include antioxidants of the sterically hindered phenol type for example, 2,6-di-tert-butyl-p-cresol;   4,4'-thiobis-(6-tert-butyl-3-methyl phenol;   2,2'-thiobis-(6-tert-butyl-4-methyl phenol);   $\alpha\lambda$,$\alpha'$-bis-(2-hydroxy-3,5-dialkyl phenyl)-p-diisopropyl benzenes;   $\alpha,\alpha'$-bis-(2-hydroxy-3,5-dialkylphenyl)m-diisopropyl benzenes;   2,2'-methylene-bis-(4-methyl-6-tert-butylphenol);   2,2'-methylene-bis-(4-methyl-6-cyclohexyl-phenol);   1,1,3-tris-(5-tert-butyl-4-hydroxy-2-methylphenyl)-butane;   tetrakis-(3,5-di-tert-butyl-4-hydroxy phenyl propionyl oxymethyl)-methane; also compounds of divalent sulphur such as, for example, dilauryl thiodipropionate; compounds of trivalent phosphorus such as, for example, triphenyl phosphite, tris-(p-nonylphenyl)-phosphite, and UV-absorbers based on 2-(2'-hydroxyphenyl)-benzotriazole such as, for example,   2-(2'-hydroxy-5'-methylphenyl)-benzotriazole,   2-(3',5'-di-tert-butyl-2'-hydroxyphenyl)-5-chlorobenzotriazole; or even UV absorbers based on benzophenone such as, for example 2-hydroxy-4-octoxy benzophenone;   2',4'-di-tert-butylphenyl-3,5-di-tert-butyl-4-hydroxybenzoate; cyanoacrylic acid esters such as, for example,   $\alpha$-cyano-$\beta$-methyl-$\beta$-(p-methoxyphenyl)-acrylate and other light stabilisers such as, for example 2,2'-thiobis-(4-tert-octylphenolate)-n-butylamine nickel.

It is even possible to use two or more of the compounds corresponding to the general formula (I) according to the invention at the same time as stabilisers.

The object of the following Examples is merely to illustrate the invention, the structures of the compounds are clearly identified by their nuclear resonance and mass spectra. M+ is the abbreviation for the mass of the molecular ion in the mass spectrum.

EXAMPLE 1

N,N'-Dicyclohexyl-N''-[2,2,6,6-tetramethyl piperidinyl]-guanidine 51.5 g of dicyclohexyl carbodiimide and 44.5 g of 4-amino-2,2,6,6-tetramethyl piperidine were mixed and the mixture subsequently heated for 6 hours to 140° C in the absence of both air and moisture. The volatile constituents were then distilled off in a high vacuum. After cooling, 82 g of the title compound were obtained in the form of a yellow resin.

$C_{22}H_{42}N_4$(362.6) observed $M^+362$

EXAMPLE 2

N-Isopropyl-N'-tert.-butyl-N''-[2,2,6,6-tetramethyl piperidinyl] guanidine 14.0 g of N-isopropyl-N'-tert-butyl-carbodiimide and 21.3 g of 4-amino-2,2,6,6-tetramethyl piperidine were mixed and heated for 8 hours to 120° C in the absence of air and moisture. The reaction mixture was then fractionated in a high vacuum, giving 17 g of the title compound in the form of a colourless liquid boiling ($bp_{0.03}$) at 110° C.

$C_{17}H_{36}N_4$ (296) observed $M^+296$

EXAMPLE 3

N,N'-Diphenyl-N''-[2,2,6,6-tetramethyl piperidinyl]-guanidine 44.5 g of 4-amino-2,2,6,6-tetramethyl piperidine were slowly added dropwise to 38.8 g of diphenyl carbodiimide. The mass formed during the exothermic reaction was heated for 1 hour to 140° C, subsequently cooled and boiled twice with cleaning spirit. After filtration and drying, 60 g of the title compound were obtained in the form of a colourless powder melting at 170° C.

$C_{22}H_{30}N_4$ (350.5) observed $M^+350$

EXAMPLE 4

N,N'-Bis-[o,o'-diisopropylphenyl]-N''-[2,2,6,6-tetramethylpiperidinyl]-guanidine 72.5 g of bis-(o,o'-diisopropylphenyl)-carbodiimide and 34.1 g of 4-amino-2,2,6,6-tetramethyl piperidine were mixed and the mixture heated for 10 hours to 140° C. Volatile fractions were then distilled off in a high vacuum at 140° C., and the residue cooled, giving 104 g of the title compound in the form of a yellow resin.

$C_{34}H_{54}N_4$ (518.8) observed $M^+518$

EXAMPLE 5

N,N'-Bis-[p-chlorophenyl]-N''-[2,2,6,6-tetramethyl piperidinyl]-guanidine 44.5 g of 4-amino-2,2,6,6-tetramethyl piperidine were added dropwise to 52.6 g of bis-[p-chlorophenyl]-carbodiimide. The mixture was stirred for 10 hours at 140° C and subsequently fractionated in a high vacuum, leaving 43 g of the title compound in the form of a yellowish liquid boiling at ($bp_{0.02}$) 180° C which crystallised slowly.

$C_{22}H_{28}Cl_2N_4$ (419.4) observed $M^+418$ for $^{35}Cl$

EXAMPLE 6

N,N'-Bis-[o-methylphenyl]-N''-[2,2,6,6-tetramethyl piperidinyl]-guanidine 44.5 g of 4-amino-2,2,6,6-tetramethyl piperidine were added dropwise to 44.2 g of bis-[o-methylphenyl]-carbodiimide. The mixture was stirred for 10 hours at 120° C and the volatile constituents were subsequently distilled off in a high vacuum at 140° C. After cooling, the compound was obtained in the form of a yellowish resin in a yield of 68 g.

$C_{24}H_{34}N_4$ (378.6) observed $M^+378$

EXAMPLE 7

Example 7 describes the production of a polymeric guanidine from a polymeric carbodiimide.

13.1 g of polymeric carbodiimide, produced from a mixture of 80 parts of 2,4-tolylene diisocyanate and 20 parts of 2,6-tolylene diisocyanate by the method described in J. Amer. Chem. Soc. 84, 3673 (1962), were dissolved in 50 ml of toluene and 35 g of 4-amino-2,2,6,6-tetramethyl piperidine added to the resulting solution. The solution was then stirred for 1 hour at room temperature and then under reflux for 4 hours. Thereafter the solvent was distilled off in vacuo and the residue freed in a high vacuum from the last volatile constituents. 44 g of polymeric guanidine were obtained in the form of a light brown resin.

EXAMPLE 8

N-Benzoyl-N'-[2,2,6,6-tetramethyl piperidinyl]-guanidine 14.6 g of benzoyl cyanamide were suspended in 100 ml of toluene, followed by the gradual dropwise addition with stirring of 17.2 g of 4-amino-2,2,6,6-tetramethyl piperidine. After stirring for another 5 hours at 50° C, the mixture was left to cool and was then filtered under suction. After drying 23 g of the title compound were obtained in the form of a colourless powder melting at 168° to 170° C.

$C_{17}H_{26}N_4O$ (302.4) observed $M^+302$

EXAMPLE 9

N-o-Methylbenzoyl-N'-[2,2,6,6-tetramethyl piperidinyl]-guanidine 50.2 g of N-o-methylbenzoyl-N'-[2,2,6,6-tetramethyl piperidinyl]-guanidine, a colourless powder melting at 138°-140° C, were obtained in the same way as in Example 8 from 32 g of o-methylbenzoyl cyanamide and 31.5 g of 4-amino-2,2,6,6-tetramethyl piperidine in 200 ml of toluene.

$C_{18}H_{28}N_4O$ (316.5) observed $M^+316$

EXAMPLE 10

N-p-Methoxybenzoyl-N'-[2,2,6,6-tetramethyl piperidinyl]-guanidine 62.4 g of N-p-methoxybenzoyl-N'-[2,2,6,6-tetramethyl piperidinyl]-guanidine, a colourless powder melting at 160° to 163° C, were obtained in the same way as described in Example 8 from 35.2 g of p-methoxybenzoyl cyanamide and 31.5 g of 4-amino-2,2,6,6-tetramethyl piperidine in 100 ml of toluene.

$C_{18}H_{28}N_4O_2$ (332.5) observed $M^+332$

EXAMPLE 11

N-p-Chlorobenzoyl-N'-[2,2,6,6-tetramethyl piperidinyl]-guanidine 65.3 G of M-p-chlorobenzoyl-N'-[2,2,6,6-tetramethyl piperidinyl]-guanidine, a colourless powder melting at 130°-134° C, were obtained in the same way as in Example 8 from 37.0 g of p-chlorobenzoyl cyanamide and 31.5 g of 4-amino-2,2,6,6-tetramethyl-piperidine in 100 ml of toluene.

$C_{17}H_{25}ClN_4O$ (336.9) observed $M^+336$

EXAMPLE 12

N-Phenyl-N'-N''-bis-[2,2,6,6-tetramethyl piperidinyl]-guanidine 46.8 g of 4-amino-2,2,6,6-tetramethyl piperidine were dissolved in 100 ml of water, followed by the dropwise addition over a period of 3 hours of a solution of 17.4 g of phenyl isocyanide dichloride in 30 ml of dioxane. After stirring for another 2 hours at room temperature, the mixture was cooled to 0°-5° C, followed by the addition of a solutiion of 8 g of sodium hydroxide in 25 ml of water. The temperature of the mixture was allowed to rise to room temperature while stirring, followed by stirring for another 2 hours at 50° C. After cooling, the colourless product was filtered off under suction and dried. Yield 27 g, mp 166°-168° C.

$C_{25}H_{43}N_5$ (413.7) observed $M^+413$

EXAMPLE 13

Example 13 demonstrates the production of the substance described in Example 12 in a biphasic system.

62.4 g of 4-amino-2,2,6,6-tetramethyl piperidine were dissolved in 400 ml of 1n sodium hydroxide. A solution of 34.8 g of phenyl isocyanide dichloride in 200 ml of methylene chloride was added dropwise with stirring to the solution at 40° C. After stirring for another 3 hours at 40° C, the mixture was left to cool, the organic phase was separated off and the solvent evaporated off in vacuo. The solid left behind was washed with acetonitrile. Yield 71 g, mp 166°-168° C.

EXAMPLE 14

N-m-Nitrophenyl-N',N''-bis-[2,2,6,6-tetramethyl piperidinyl]-guanidine 39 g of 4-amino-2,2,6,6-tetramethyl piperidine were added to 100 ml of water and 10 g of sodium hydroxide dissolved therein. A solution of 27.4 g of m-nitrophenyl isocyanide dichloride in 60 ml of dioxane was added dropwise to the mixture over a period of 3 hours, followed by stirring for 1 hour at 60° C. After cooling, the deep red coloured organic phase was separated off, the solvent was evaporated off in vacuo and the residue left standing until it crystallised. The crystals formed were filtered under suction through a glass frit and washed twice with 25 ml of ether. Yield: 28.4 g of yellow crystals melting at 83°-85° C. The compound contained 1 mole of crystallised dioxane.

$C_{25}H_{42}N_6O_2$ (458.7) observed $M^+458$

EXAMPLE 15

N-Phenyl-N'-[2,2,6,6-tetramethyl piperidinyl]-guanidine 46.5 g of aniline were dissolved in 150 ml of tetrahydrofuran and 15 g of cyanogen chloride added dropwise to the resulting solution at 0° C. After stirring for 15 minutes, the aniline hydrochloride precipitated was separated by filtration. 42.7 g of 4-amino-2,2,6,6-tetramethyl piperidine were added dropwise to the filtrate at room temperature and the mixture was stirred for another 4 hours at room temperature. After filtration under suction and drying, 67 g of the compound were obtained in the form of a colourless powder melting at 146° to 148° C. After recrystallisation from isopropanol, the substance had a melting point of 154° C.

$C_{16}H_{26}N_4$ (274.4)

EXAMPLE 16

(a) Procedure for producing the polyurethane to be stabilised 1000 parts of an adipic acid/1,6-hexane diol/2,2-dimethyl-1,3-propane diol mixed polyester (molar ratio of the glycols 65:35; molecular weight 1860) were mixed with 19.8 parts of N-methyl-bis-($\beta$-hydroxypropyl)-amine, 280.7 parts of diphenyl methane-4,4'-diisocyanate and 328 parts of dimethyl formamide, and the resulting mixture was heated for 72 minutes to 45°-50° C. After cooling to room temperature, the NCO-prepolymer formed had an NCO content of 2.92% (based on solids content).

748 parts of this prepolymer solution were introduced with stirring into a solution of 33.7 parts of $H_2N.NH.CO.NH.CH_2.CH_2.CO.NH.NH_2$ in 67 parts of water and 1570 parts of dimethyl formamide. The homogeneous viscous solution was pigmented with 4% of rutile, based on solids, and had a viscosity of 440 poises at 25° C.

(b) Measurement of the stabilising effect using elastomer films and (cut) filaments The stabilisers and comparison substances were added (in the form of a concentrated solution in dimethyl formamide) to the elastomer solutions in the quantities specified, followed by stirring for the purposes of homogenisation, after which the solutions were processed into the shaped articles.

The solutions were preferably coated onto glass plates in layer thicknesses, of about 0.2 mm and dried in a drying cabinet at 70° to 100° C to form films.

In a screening test the films can be cut into approximately 1 cm wide strips and exposed to light in a Fadeometer (assessment of discoloration and the qualitative behaviour of degradation on exposure to light).

The films are preferably cut in a film cutting machine into rectangular filaments with an overall denier of about 200 to 300 dtex and exposed to light in the form of these cut filaments. On account of the large surface of the filaments, the damage caused by the action of light is more intensive and substantially equivalent to the behaviour of filaments spun on an industrial scale. The solutions can also be wet-spun or dry-spun.

(c) Stabiliser additions and stabilising effect

The quantities of stabiliser specified were added to the polyurethane (urea) elastomer solutions a), the solutions were dried to form films and the films, after cutting into 300 dtex filaments, were exposed to light in a Fadeometer (cf. Table) and (in some cases) tested for tensile strength, elongation at break and discoloration (cf. Table 1).

The elastomer solutions containing 2% of stabiliser 1) were processed into elastomer filaments (approximately 300 dtex) both by the dry spinning process and by the wet spinning process. These filaments showed substantially the same stabilisation to discoloration and approximately the same half lives of their tensile strength values after exposure to UV-light as the filaments cut from films.

The stabilising additives had a distinct stabilising effect both against deterioration of tensile strength, reduction in elongation at break and, in particular, against discoloration under the effect of light.

Table 1

Stabilising effect in polyester urethanes(according to Example 16/a): Tensile strength/elongation at break and discoloration of cut filaments with and without additions of stabilizer

| Stabiliser according to Example No: | Quantity of stabiliser added(based on solids) % | Tensile strength/elongation at break (cN/dtex) / (%) and discoloration of cut filaments (300 dtex) after Fadeometer testing for | | | | |
|---|---|---|---|---|---|---|
| | | 0 | 22 | 44 | 66 | 88 hours |
| (Comparison) | none | 0.53/620 colourless | 0.37/525 yellowish-yellow | 0.22/436 yellow | n.m. yellow-brown | n.m. yellow-brown |
| 1 | 2.0 | 0.61/590 colourless | 0.56/570 colourless | 0.48/540 colourless | 0.46/530 colourless | 0.35/485 almost colourless |
| 1 | 1.5 | colourless | colourless | colourless | colourless | almost colourless |
| 1 | 1.0 | colourless | colourless | colourless | almost colourless | almost colourless to yellowish |
| 1 | 0.5 | colourless | colourless | colourless | almost colourless | almost colourless to yellowish |
| 1 | 0.3 | colourless | colourless | colourless | almost colourless | yellow |
| (1) | (0.1) | colourless | colourless | almost colourless | yellowish | yellow |
| 4 | 2.0 | 0.55/640 colourless | 0.55/640 colourless | 0.42/550 almost colourless | 0.40/545 yellowish | 0.30/490 yellowish |
| 3 | 2.0 | 0.61/675 colourless | 0.54/655 colourless | 0.44/630 almost colourless | 0.42/620 yellowish | 0.30/560 yellowish |
| 5 | 2.0 | 0.58/670 colourless | 0.54/665 colourless | 0.45/610 almost | 0.37/560 almost | 0.29/486 yellowish |

Table 1-continued

Stabilising effect in polyester urethanes(according to Example 16/a): Tensile strength/elongation at break and discoloration of cut filaments with and without additions of stabilizer

| Stabiliser according to Example No: | Quantity of stabiliser added(based on solids) % | Tensile strength/elongation at break (cN/dtex) / (%) and discoloration of cut filaments (300 dtex) after Fadeometer testing for | | | | |
|---|---|---|---|---|---|---|
| | | 0 | 22 | 44 | 66 | 88 hours |
| 8 | 2.0 | colourless | colourless | colourless | colourless almost colourless | almost colourless to yellowish |
| 9 | 2.0 | colourless | colourless | colourless | yellowish | yellowish |
| 10 | 2.0 | colourless | colourless | colourless | yellowish | yellowish |
| 11 | 2.0 | colourless | colourless | colourless | yellowish | yellowish |
| 12 | 2.0 | colourless | colourless | colourless | colourless | almost colourless | n.m. = cannot be measured: tensile strength below 0.1 cN/dtex; elongation below 200%

The half lives of the tensile strength after exposure to light were considerably improved by the additions of stabiliser (approximately 100% to 200% improvement from about 30 to about 90 Fadeometer hours), the other elastic properties, such as elongation at break, modulus and permanent elongation, being retained much more satisfactorily. The surfaces of the polyurethane films and coatings remained elastic on elongation, whereas in the case of the films with considerably reduced tensile strength they develop a crazed surface structure.

Another surprising characteristic of the stabilising additives was their effectiveness when added in small quantities. Even when added in a quantity as small as 0.1%, a distinct, initial stabilising effect was recognisable, although it was less active at higher light intensities. In quantities upwards of about 0.3%, however, the stabilising additives had a distinct stabilising effect which was improved relatively little in regard to discoloration by increasing the quantity added.

Combination with other types of antioxidants, for example phenolic types, was found to afford certain advantages, although the influence of the stabilisers according to the invention generally predominates.

However, the particular effectiveness of the stabilisers is not confined solely to this tetramethyl piperidine radical, instead it is decisively modified by the overall constitution of the stabiliser. This is illustrated in the comparison tests summarised in Table 3 where similar known compounds (cf. Table 2) are shown to have a very much weaker effect. The particular effectiveness of the stabilisers according to the invention could not be derived therefrom.

Table 2

Comparison Substances:

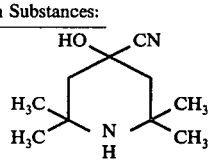

Table 2-continued

Comparison Substances:

| B | 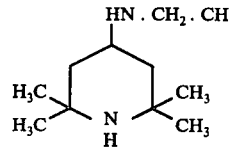 | according to DT-OS 2,349,962 |
| C | 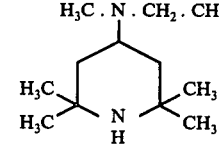 | according to DT-OS 2,349,962 |
| D | 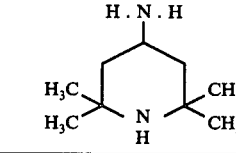 | according to US-PS 3,147,268 NL-OS 7,313,683 |

The stabilising effects of these substances in the polyurethane according to Example 17 a) are shown in Table 3:

Table 3

Tensile strength/elongation at break and discoloration of cut filaments of PU-elastomers using (partly known) compounds of the tetramethyl piperidine series (Comparison Tests)

| Comparison substance | Quantity (%) | Tensile strength/elongation at break and discoloration (cN/dtex) / (%) after Fadeometer testing for | | | | |
|---|---|---|---|---|---|---|
| | | 0 | 22 | 44 | 66 | 88 hours |
| A | 2.0 | 0.56/665 colourless | 0.28/490 yellowish | 0.18/422 yellow | — yellow brown | — brown yellow |
| B | 2.0 | colourless | yellow | yellow brown | yellow brown | brown yellow |
| C | 2.0 | colourless | almost colourless | yellow | yellow brown | brown yellow |
| D | 2.0 | colourless | yellowish | yellow | yellow brown | brown yellow |

As the results show, there is little or no improvement in resistance to degradation or in reduction of discoloration in polyurethanes. The stabilisers according to the invention have a considerably better stabilising effect.

EXAMPLE 17

(a) Procedure for producing the polyurethane to be stabilised 718 parts of the NCO-prepolymer described in Example 10 were stirred into a carbamate suspension formed by adding 25 parts of solid carbon dioxide to a solution of 12.68 parts of ethylene diamine (99%) in 1578 parts of dimethyl formamide. A highly viscous solution (viscosity approximately 210 poises) was obtained after pigmenting with 4% of rutile.

(b) Stabilising the polyurethane according to 17(a)

2% of each of the stabilisers according to Examples (1) and (4) were dissolved in portions of the solutions of Example 17(a) (ethylene diamine-extended polyester urethane) and, after processing into cut filaments (approximately 250 dtex), were compared with stabiliser-free filaments. The less stable polyurethane (by comparision with Example 16 a) was also improved by more than 100% in the half life of its tensile strength by addition of the stabilisers (from about 12 to about 30 Fadeometer hours).

EXAMPLE 18

600 parts of dimethyl terephthalate, 20 parts of dimethyl isophthalate and 980 parts of polytetramethylene glycol (molecular weight 980) were melted at about 150° to 165° C with 750 parts of 1,4-butane diol, the resulting melt was mixed with 0.45 mMole of Ti-$(OC_4H_9)_4/(CH_3COO)_2 \cdot Mg$ and 0.05% by weight of di-$\beta$-naphthyl-p-phenylene diamine and the ester exchange reaction was carried out under atmospheric pressure at 200° to 220° C until the elimination of methanol had ceased. The temperature was then increased to 250° C, a vacuum was applied to an increasing extent and the excess butane diol distilled off from the mixture under a pressure of about 0.3 to 0.5 Torr. After a polycondensation time of about 75 minutes, the melt was discharged under nitrogen and cooled.

The segmented copolyester ether elastomer was dissolved in hot tetrachloroethane to form a 20% solution. The stabiliser was dissolved in portions of the solution in quantities of 2%, based on solids, and the solution dried to form films.

The films (approximately 0.2 mm thick) were exposed to UV light in a Fadeometer. Whereas the unstabilised film was lemon yellow in colour after an exposure time of 1320 minutes and had lost its elasticity, i.e. it was brittle and broke very easily, the film containing 2% of stabiliser No. 1 was almost colourless and remained elastic. With longer exposure, the slight yellowing faded; the stabilised films only began to turn brittle after an exposure time of about 2500 minutes.

EXAMPLE 19

A 12% solution of a copolyamide (produced by the polycondensation of 50 parts by weight of caprolactam, 35 parts by weight of 1,6-hexamethylene diammonium adipate and 20 parts by weight of 1,6-hexamethylene diammonium sebacate) in 85 parts by weight of methanol, 6 parts by weight of isopropanol, 4.5 parts by weight of isobutanol and 4.5 parts by weight of water, was dried to form approximately 0.10 mm thick films
(a) without the addition of a stabiliser, (b) with 2% by weight of the stabiliser according to Example 3 followed by exposure to light for 300 hours in a Fadeometer.

Thereafter, the unstabilised copolyamide (a) was brittle and broke when the film is bent, whereas the stabilised film (b) remained flexible.

EXAMPLE 20

400 parts of a polytetramethylene ether diol with a molecular weight of 1045 (POLYMEG 1000, a product of the Quaker Oats Company) were reacted at 50° C with a solution of 140.8 parts of diphenyl methane-4,4'-diisocyanate and 135 parts of dimethyl formamide until the NCO content amounts to 3.2% (based on the solids content of the prepolymer solution).

6.02 parts of hydrazine hydrate were dissolved in 898 parts of dimethyl formamide, the carbonate suspension of the hydrazine was formed by the addition of 10 parts of solid carbon dioxide and the suspension thus formed was reacted by stirring in 430 parts of the above NCO-prepolymer solution to form the segmented linear polyurethane. The homogeneous, viscous elastomer solution (51 poises/20° C) was pigmented with a $TiO_2$-suspension (4% of $TiO_2$/rutile, based on elastomer solids).

The solution was cast into elastomer films both with and without (comparison test) additions of stabiliser.

The elastomer films thus produced were Fadeometer tested in the form of strips (for results, see Table 4). The results show that the unstabilised polyether urethane yellowed very quickly and was degraded after only 22 hours in the Fadeometer (no more strength, surface of the film "crackles" under minimal elongation).

Table 4

| | Fadeometer testing of film strips | | | | |
|---|---|---|---|---|---|
| | after 22 hours | 44 hours | 66 hours | 88 hours | 156 hours |
| without stabiliser | yellow, films have no strength and are "crackled". substantially degraded strength | yellow(brown) Films without strength, totally degraded | yellow-brown | Films without strength totally degraded | totally degraded |
| + 2% by weight of stabiliser according to Example 1 | colourless strength substantially intact | colourless | colourless strength substantially intact, no "crackling", fully elastic | colourless, fully elastic | colourless, fully elastic |

EXAMPLE 21

A copolymer of 60 parts by weight of acrylonitrile and 40 parts by weight of vinyl chloride was dissolved in dimethyl formamide at 40° C to form a 22% solution. Portions of the solution with and without additions of stabiliser were cast to form approximately 0.15 mm thick films, followed by Fadeometer-testing.

Even when the solution was dried into films (about 1 hour/100° ), the unstabilised film turns pale brownish in colour, whereas the film containing 2% by weight of stabiliser No. 1 was colourless. In addition to this heat-stabilising effect, the stabiliser also afforded protection against UV-light. After 1320 minutes' Fadeometer testing, the stabilised film had not discoloured, whereas the discoloration of the unstabilised film had increased.

EXAMPLE 22

4-Cyanamido-2,2,6,6-tetramethyl piperidine 156 g (1 mole) of 4-amino-2,2,6,6-tetramethyl piperidine were dissolved in 500 ml of methylene chloride, 40 g (1 mole) of sodium hydroxide in 500 ml of water were introduced and 51 ml of cyanogen chloride were added dropwise at 0° to 5° C. The mixture was then stirred until it reached room temperature, after which 4-cyanamido-2,2,6,6-tetramethyl piperidine melting at 240° C was filtered off in a yield of 166 g (corresponding to 91.5% of the theoretical yield).

$C_{10}H_{19}N_3$ (181.3) observed $M^{30}$ 181

EXAMPLE 23

4-(N-Methyl-N-cyano)-amino-2,2,6,6-tetramethyl piperidine 170 g (1 mole) of 4-N-methyl amino-2,2,6,6-tetramethyl piperidine were dissolved in 500 ml of methylene chloride, 40 g (1 mole) of sodium hydroxide in 500 ml of water were introduced and 51 ml of cyanogen chloride added dropwise at 0° to 5° C. The mixture was then stirred until it reaches room temperature, after which the organic phase was separated off, dried over sodium sulphate, filtered and the methylene chloride was distilled off, leaving as residue 162 g (83% of the theoretical yield) of 4-(N-methyl-N-cyano)-amino-2,2,6,6-tetramethyl piperidine melting at 73° to 77° C.

$C_{11}H_{21}N_3$ (195.3) observed $M^+$195

EXAMPLE 24

4-(N-cyclohexyl-N-cyano)-amino-2,2,6,6-tetramethyl piperidine melting at 123° C was obtained in the same way as in Example 2 using 4-cyclohexyl amino-2,2,6,6-tetramethyl piperidine.

$C_{16}H_{29}N_3$ (263.4) observed $M^+$263

EXAMPLE 25

4-(N-Benzyl-N-cyano)-amino-2,2,6,6-tetramethyl piperidine melting at 215°–219° C was obtained in the same way as in Example 2 using 4-benzyl amino-2,2,6,6-tetramethyl piperidine.

$C_{17}H_{25}N_3$ (271.4) observed $M^+$271

We claim:

1. A process for stabilizing a synthetic polymer which comprises adding to the polymer a stabilizing amount of a compound of the formula:

$$\begin{array}{c} N-R_6 \\ \parallel \\ X-C-Z \end{array}$$

or a tautomer thereof wherein X is of the formula:

[structure: piperidine ring with $-N-R_3$ at 4-position, $CH_3, CH_3$ at one ring carbon, $R_2, R_1$ at another ring carbon, and N-A in ring]

wherein A is hydrogen, alkyl having 1 to 20 carbon atoms, alkenyl or alkinyl having 3 to 12 carbon atoms, aralkyl having 7 to 12 carbon atoms or —CH$_2$—CHR$_4$—OH wherein R$_4$ is hydrogen, methyl or phenyl;
R$_1$ and R$_2$ are the same or different and are each alkyl having 1 to 12 carbon atoms or R$_1$ and R$_2$ together with the ring carbon atom to which they are attached form a cycloalkyl ring with 5 to 12 ring carbon atoms;
R$_3$ is hydrogen, alkyl having b 1 to 20 carbon atoms, cycloalkyl having 5 to 12 carbon atoms, aralkyl having 7 to 12 carbon atoms, β-cyanoethyl, β-alkoxy carbonyl ethyl having 1 to 3 carbon atoms in the alkoxy moiety, aryl having 6 to 14 carbon atoms, —CH$_2$—CHR$_4$—OH wherein R$_4$ is hydrogen, methyl or phenyl, or

[structure: piperidine ring with $CH_3, CH_3$ at one ring carbon, $R_2, R_1$ at another ring carbon, and N-A in ring]

wherein A, R$_1$ and R$_2$ are as defined above;
Z has the same meaning as X or is —NUV wherein U and V are the same or different and are each hydrogen, alkyl having 1 to 20 carbon atoms, cycloalkyl having 5 to 12 carbon atoms, aralkyl having 7 to 12 carbon atoms or aryl having 6 to 14 carbon atoms, or said aryl substituted by alkyl having 1 to 8 carbon atoms, alkoxy having 1 to 4 carbon atoms, hydroxy, nitro, chlorine or by bromine and wherein the radical U may also be R$_5$-W wherein R$_5$ is aryl having 6 or 10 ring carbon atoms, said aryl substituted by chlorine, bromine, methyl or by methoxy, alkyl having 1 to 8 carbon atoms or aralkyl having 7 to 12 carbon atoms;
W is —CO or —SO$_2$ and R$_6$ is hydrogen, alkyl having 1 to 20 carbon atoms, cycloalkyl having 5 to 7 carbon atoms, aralkyl having 7 to 12 carbon atoms, aryl having 6 to 14 carbon atoms or said aryl substituted by alkyl having 1 to 8 carbon atoms, alkoxy having 1 to 4 carbon atoms, hydroxy, nitro, chlorine or by bromine.

2. The process of claim 1 wherein R$_1$ and R$_2$ are the same or different and are alkyl having 1 to 4 carbon atoms or together with the ring carbon atom to which they are attached form a cyclohexyl ring;
A is hydrogen or alkyl having 1 to 4 carbon atoms;
R$_3$ is hydrogen, alkyl having 1 to 8 carbon atoms, cyclohexyl, methyl cyclohexyl, benzyl, β-cyanoethyl, 2-methoxy carbonyl ethyl or β-hydroxy ethyl;
U and V are the same or different and are hydrogen, alkyl having 3 to 8 carbon atoms, cyclohexyl, benzyl or said aryl;
R$_5$ is phenyl, chlorophenyl, bromophenyl, tolyl, methoxyphenyl, naphthyl or benzyl;
W is —CO and R$_6$ is hydrogen, alkyl having 3 to 12 carbon atoms, cyclohexyl, phenyl, naphthyl, tolyl, chlorophenyl or nitrophenyl.

3. The process of claim 1 wherein R$_1$ and R$_2$ are methyl;
A is hydrogen or methyl;
R$_3$ is hydrogen, methyl, cyclohexyl, benzyl, β-cyanoethyl or β-hydroxy ethyl;
U and V are the same or different and are propyl, isopropyl, butyl, isobutyl, t.-butyl, hexyl, cyclohexyl, phenyl, tolyl, t.-butyl phenyl, chlorophenyl or naphthyl;
R$_5$ is phenyl, chlorophenyl, tolyl or methoxy phenyl;
W is —CO and R$_6$ is hydrogen, phenyl, chlorophenyl, nitrophenyl or naphthyl.

4. The process of claim 1 wherein the compound of said formula is added in an amount of from 0.01 to 5% by weight, based on the polymer.

5. The process of claim 1 wherein the compound of said formula is added in an amount of from 0.05 to 3.5% by weight, based on the polymer.

6. The process of claim 1 wherein the compound of said formula is added in an amount of from 0.05 to 2.5% by weight, based on the polymer.

7. A synthetic polymer stabilized by the process claimed in claim 1.

8. The synthetic polymer of claim 7 containing from 0.01 to 5% by weight of said compound of said formula, based on the weight of said synthetic polymer.

* * * * *